(12) United States Patent
Lutzmayr

(10) Patent No.: US 11,252,796 B2
(45) Date of Patent: Feb. 15, 2022

(54) SUPPLY CIRCUIT AND LIGHT MAGNIFIER

(71) Applicant: charismaTec OG, Graz (AT)

(72) Inventor: Dieter Lutzmayr, Graz (AT)

(73) Assignee: charismaTec OG, Graz (AT)

( * ) Notice: Subject to any disclaimer, the term of this patent is extended or adjusted under 35 U.S.C. 154(b) by 0 days.

(21) Appl. No.: 17/322,009

(22) Filed: May 17, 2021

(65) Prior Publication Data

US 2021/0368599 A1    Nov. 25, 2021

(30) Foreign Application Priority Data

May 19, 2020 (DE) ............ 10 2020 113 565.3

(51) Int. Cl.
| | |
|---|---|
| *H05B 45/14* | (2020.01) |
| *H05B 45/395* | (2020.01) |
| *G02B 25/02* | (2006.01) |
| *G02B 25/00* | (2006.01) |
| *H05B 45/3725* | (2020.01) |

(52) U.S. Cl.
CPC .......... *H05B 45/14* (2020.01); *G02B 25/002* (2013.01); *G02B 25/02* (2013.01); *H05B 45/3725* (2020.01); *H05B 45/395* (2020.01)

(58) Field of Classification Search
None
See application file for complete search history.

(56) References Cited

U.S. PATENT DOCUMENTS

| | | | | |
|---|---|---|---|---|
| 8,344,653 B2* | 1/2013 | Lee | ......... | H05B 45/46 |
| | | | | 315/291 |
| 8,599,915 B2* | 12/2013 | Zhao | ......... | H05B 45/46 |
| | | | | 375/238 |
| 9,443,478 B2 | 9/2016 | Min | | |
| 2010/0134040 A1* | 6/2010 | Elder | ......... | H05B 45/38 |
| | | | | 315/294 |

(Continued)

FOREIGN PATENT DOCUMENTS

EP          3344013 A1    7/2018

*Primary Examiner* — Amy Cohen Johnson
*Assistant Examiner* — James H Cho
(74) *Attorney, Agent, or Firm* — Eschweiler & Potashnik, LLC

(57) ABSTRACT

A supply circuit for supplying a light-emitting element includes a voltage regulator having a voltage output for outputting an output voltage and having a control input for regulating the output voltage based on a voltage at a divider node of a voltage divider. A first and a second terminal are used to connect the light emitting element, the first terminal being coupled to the voltage output and the second terminal being coupled to a reference potential terminal via a series resistor. The supply circuit further includes a control block having an analog-to-digital converter for generating a digital voltage feedback value from a voltage applied to the second terminal, a control element, and a digital-to-analog converter coupled to the divider node for outputting an analog control signal based on a digital control value. The control element is arranged to compare the voltage feedback value with a reference feedback value, if the voltage feedback value is less than the reference feedback value, to change the control (Continued)

value in a first direction, and if the voltage feedback value is greater than the reference feedback value, to change the control value in a second direction.

13 Claims, 2 Drawing Sheets

(56) References Cited

U.S. PATENT DOCUMENTS

| | | | |
|---|---|---|---|
| 2011/0062872 A1* | 3/2011 | Jin | ........................ H05B 45/325 |
| | | | 315/122 |
| 2011/0121755 A1* | 5/2011 | Han | ........................ H05B 45/46 |
| | | | 315/294 |
| 2020/0113023 A1 | 4/2020 | Yu | |

* cited by examiner

SUPPLY CIRCUIT AND LIGHT MAGNIFIER

CROSS REFERENCE TO RELATED APPLICATIONS

This application claims priority to German Application number 10 2020 113 565.3 filed on May 19, 2020, the contents of which are incorporated by reference in their entirety.

FIELD

The present disclosure relates to a supply circuit for supplying light-emitting elements, in particular semiconductor elements, such as light-emitting diodes, LEDs. The present disclosure further relates to a light magnifier with such a supply circuit.

BACKGROUND

Light emitting elements such as LEDs are used in many applications nowadays. Especially in portable applications, which are supplied by batteries or accumulators, the efficiency in the supply plays a major role. Especially in the case of semiconductor-based light-emitting elements, it is necessary to provide a desired current on the one hand, while on the other hand a supply voltage must be provided in such a way that a forward voltage of the light-emitting element is reliably achieved.

In conventional solutions, the voltage to be supplied to the light-emitting element is therefore fixed, for example, at a value that is higher than a nominal forward voltage of the element. However, this means that if the actual forward voltage differs depending on the component, the current through the element that is set via a series resistor in the strand of the element also varies. This can lead to the light-emitting element either not lighting up or not lighting up as desired, or to unnecessary power being consumed in the series resistor.

SUMMARY

The present disclosure provides an improved control concept for the supply of light-emitting elements, with which a higher efficiency can be achieved.

The improved control concept is based on the idea that basically a voltage regulator is used, which controls an output voltage for delivery to a light emitting element via a feedback of the output voltage via a voltage divider. In order to simultaneously adjust a current across a series resistor in the current path of the light emitting element, this current or the voltage drop across the series resistor is evaluated in order to influence the feedback voltage for regulating the voltage regulator. For this purpose, an additional control signal is applied to a divider node of the voltage divider so that the control of the voltage regulator adjusts the output voltage accordingly. In one example, the output voltage is increased if it is determined that the voltage drop across the series resistor is too low, and vice versa. Thus, it is ensured that a desired current flow through the light emitting element is established and, at the same time, a sufficient voltage is present to operate the light emitting element.

Accordingly, an embodiment of a supply circuit for supplying a light emitting element according to the control concept comprises a voltage regulator with a voltage input for supplying a supply voltage, with a voltage output for outputting an output voltage, and with a control input for controlling the output voltage. The supply circuit further comprises first and second terminals for connecting the light emitting element, wherein the first terminal is coupled to the voltage output and the second terminal is coupled to a reference potential terminal via a series resistor. A voltage divider is connected between the first terminal and the reference potential terminal and comprises a divider node for tapping a divided voltage. The supply circuit further comprises a comparator having a first input for receiving a reference voltage, a second input connected to the divider node, and an output connected to the control input.

According to the control concept, the supply circuit further comprises a control block comprising an analog-to-digital converter, AD converter, for generating a digital voltage feedback value from a voltage applied to the second terminal, a control element, such as a microcontroller, and a digital-to-analog converter, DA converter, coupled to the divider node, for outputting an analog control signal based on a digital control value. The control element is configured to compare the voltage feedback value with a reference feedback value. If the voltage feedback value is smaller than the reference feedback value, the control value is changed in a first direction, and if the voltage feedback value is larger than the reference feedback value, the control value is changed in a second, different direction.

The digital control value thus determines the amount of influence at the divider node of the voltage divider, so that controlling the voltage regulator through the voltage divider and comparator results in an increase or decrease in the output voltage. This in turn causes the desired setting of the voltage drop across the series resistor or the resulting desired current flow.

The voltage divider is formed, for example, by a series connection of a first and a second resistor, which are dimensioned substantially in such a way that the value of the reference voltage results for a desired, safe output voltage at the divider node.

The supply voltage can be provided, for example, by a battery or rechargeable battery, or by a power supply.

The light emitting device is, for example, a light emitting diode or laser diode such as a surface emitter or VCSEL, or another corresponding semiconductor device.

In one embodiment of the supply circuit, the DA converter is coupled to the divider node via a load resistor. In this case, the control element is configured to output the control signal as a control voltage. When the voltage feedback value is smaller than the reference feedback value, the control voltage is decreased by the control element through the control value, and, when the voltage feedback value is larger than the reference feedback value, the control voltage is increased by the control element through the control value. When the control voltage is decreased, this results in a positive current change out of the divider node through the load resistor, so the output voltage must increase to compensate for this current flow. Correspondingly, increasing the control voltage results in a negative current change out of the divider node through the load resistor, thus decreasing the output voltage.

For example, the control element is configured to output the control voltage with a voltage that is in between a reference voltage at the reference potential terminal and the reference voltage. For example, the influence of the control voltage is neutralized if it is equal to the reference voltage, which also occurs at the divider node when the control is fully regulated. When the control voltage is equal to the reference voltage, the result is a condition corresponding to the parallel connection of the load resistor with the resistor of the voltage divider arranged between the divider node and the reference potential terminal.

Thus, the DA converter is implemented as a voltage-to-digital-to-analog converter.

In an alternative embodiment, the DA converter is implemented as a current-to-digital-to-analog converter. For example, the DA converter is coupled to the divider node, wherein the control signal is a control current. In this case, the control element is configured to increase the control current through the control value when the voltage feedback value is smaller than the reference feedback value, and to decrease the control current through the control value when the voltage feedback value is larger than the reference feedback value. In this case, the control current flows, for example, from the divider node toward the DA converter.

In various embodiments, the supply circuit further comprises at least one further terminal coupled to the reference potential terminal via a further series resistor for connecting at least one further light emitting element between the first terminal and the at least one further terminal. Thereby, the at least one further terminal is coupled with the control block for generating at least one further voltage feedback value. The control element is configured to adjust the control value in dependence on a smallest value from: the voltage feedback value, and the at least one further voltage feedback value. This can ensure, for example, that both the light-emitting element at the second terminal and the light-emitting element at the further terminal are each supplied with a sufficiently high voltage, even if, for example, the forward voltages differ from one another due to manufacturing reasons or the like.

Instead of a single light-emitting element, for example a light-emitting diode or a laser diode, a respective strand connected to the first terminal can also contain several such elements connected in series, whose forward voltages then add up accordingly and through which the same current flows.

The control concept is of course not limited to two strands with light-emitting elements, but can also supply other strands, each connected between the first terminal and a corresponding additional terminal from which a voltage feedback value is fed back to the control block.

For the feedback of multiple voltage feedback values, the control block comprises, for example, a multiplexer coupled with the second terminal and with the at least one additional terminal on its input side, and coupled with the AD converter on its output side. Thus, an AD converter with a single channel can be used.

Alternatively or additionally, the AD converter comprises at least one further input coupled with the at least one additional terminal. Thus, AD converters with multiple input channels can also be used.

The supply circuit does not necessarily comprise the light emitting element, but in principle only provides the connections for such an element. However, in various embodiments, the supply circuit may further comprise one or more series-connected light-emitting diodes or other semiconductor-based light-emitting elements as the light-emitting element.

In various embodiments of the supply circuit, the voltage regulator is implemented as one of the following: a linear regulator, e.g. a low dropout, LDO regulator, a buck converter, a boost converter, an inverse converter or buck-boost converter, or a charge pump, wherein this enumeration is not limiting and further implementations of voltage regulators are possible.

In addition to influencing regulation of the output voltage, in various embodiments of the supply circuit, the control element may also be configured to detect, based on the voltage feedback value, whether a connection between the first and second terminals is open, and/or, whether the connection between the first and second terminals is shorted. Such states arise, for example, in the case of defective light-emitting elements in which either current flow is no longer possible or these are blown out, for example, and produce a short circuit between the corresponding two terminals. This can be determined, for example, from the level of the voltage feedback value.

The supply circuit according to one of the embodiments described can be used, for example, in a light magnifier comprising one or more magnifying lenses for optical magnification of an object. The supply circuit with one or more corresponding light-emitting elements is thereby provided for illuminating the object.

For example, one light-emitting element is provided, which is connected between the first and second terminals and is configured to emit visible light, for example. In addition, however, another light-emitting element may be provided between the first terminal and the at least one further terminal, which is configured to emit light in the ultraviolet region. Further light emitting elements in the light magnifier for emitting visible and/or invisible light are also possible.

BRIEF DESCRIPTION OF THE DRAWINGS

The control concept is explained in more detail below by means of example embodiments with reference to the drawings. Here, similar elements or elements of the same functions are designated with the same reference signs. Therefore, a repeated explanation of individual elements is omitted where appropriate.

In the drawings.

DETAILED DESCRIPTION

Figure 1:
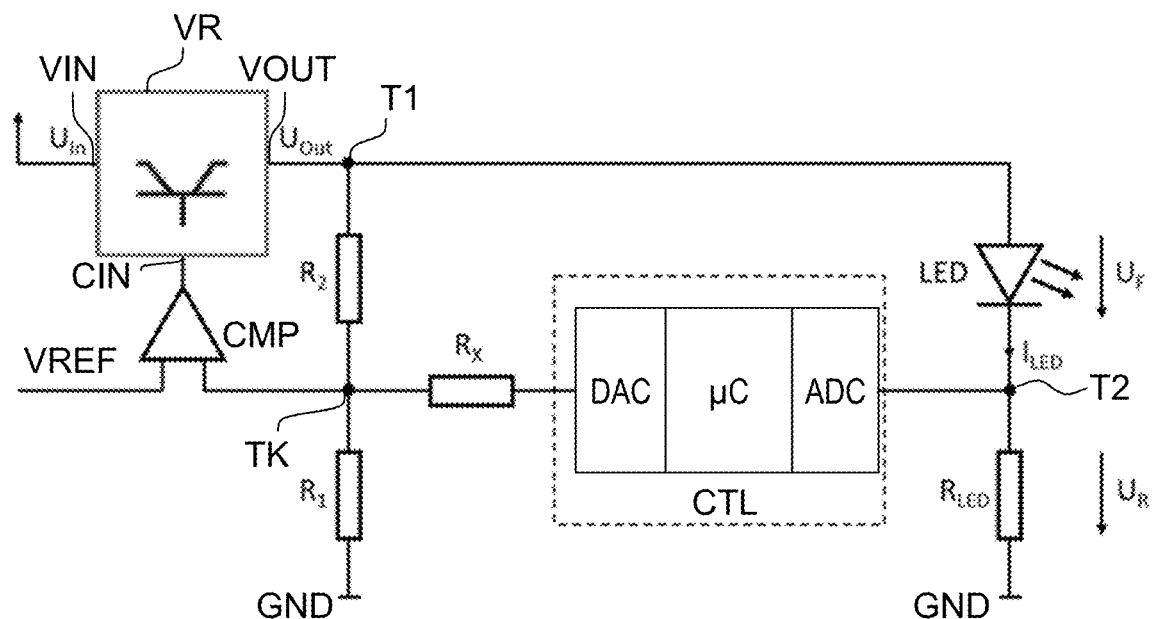
FIG. 1 shows an example embodiment of a supply circuit.

FIG. 1 shows an example embodiment of a supply circuit for supplying a light emitting element LED according to the control concept, wherein the light emitting element is designed, for example, as a light emitting diode or laser diode such as a surface emitter or VCSEL, or as another corresponding semiconductor component. The supply circuit comprises a voltage regulator VR with a voltage input VIN for feeding a supply voltage UIn, with a voltage output VOUT for delivering an output voltage UOut, and with a control input CIN for controlling the output voltage. The voltage regulator VR may be implemented in one of many implementations.

For example, the supply voltage UIn can be provided by a battery or a rechargeable battery, or by a power supply.

The supply circuit further comprises a first terminal T1 and a second terminal T2 for connecting the light emitting element LED. Here, the first terminal T1 is coupled with the voltage output VOUT, and the second terminal T2 is coupled with a reference potential terminal GND via a series resistor RLED.

The supply circuit further comprises a voltage divider, which in this example embodiment is implemented as a resistor divider and connects the first terminal T1 with the reference potential terminal GND. A first resistor R1 of the resistor divider connects a divider node TK with the reference potential terminal GND, while a second resistor R2 connects the first terminal T1 with the divider node TK.

The supply circuit further comprises a comparator CMP, which comprises a first input for receiving a reference voltage VREF and a second input connected with the divider node TK. An output of the comparator CMP is connected to the control input CIN of the voltage regulator VR. For example, the comparator CMP controls the voltage regulator VR such that the output voltage UOut results in a divided voltage at the divider node TK corresponding to the reference voltage VREF.

According to the control concept, the supply circuit further comprises a control block CTL having an AD converter ADC for generating a digital voltage feedback value from a voltage applied to the second terminal T2, and a control element μC or circuit implemented, for example, as a microcontroller, and a DA converter DAC coupled to the divider node TK via a load resistor RX.

During operation of the supply circuit with the light-emitting element LED, the voltage at the first terminal T1, i.e. substantially the output voltage UOut, is divided into a forward voltage UF across the light-emitting element and a bias voltage UR across the series resistor RLED. The value of the bias voltage UR and the value of the series resistor RLED determine the current ILED that flows through the light emitting element LED. In order to be able to set this current ILED or the bias voltage UR in a controlled manner, the corresponding voltage feedback value is evaluated in the control element and compared with a reference feedback value. Depending on the comparison, a digital control value can then be influenced, which is converted into a control voltage by the DA converter DAC. Since the reference voltage VREF is essentially set at the divider node via the control with the comparator CMP and the voltage divider R1, R2, the control voltage in conjunction with the load resistor RX leads to an influence on the conditions at the divider node TK, in particular in the form of changed current flows.

For example, when the supply circuit is started without the influence of the control block CTL, a minimum voltage desired for the overall system should be present at the first terminal T1, from which in particular it can be controlled upwards, but not downwards in one embodiment. Accordingly, the voltage divider R1, R2 is designed, for example, so that exactly the reference voltage VREF is set at the divider node TK without the influence of the load resistor RX or the control block CTL. The influence of the load resistor RX can be neutralized, for example, by applying the same voltage at the output of the DAC as at the divider node TK, i.e. the reference voltage VREF. VREF is provided, for example, via a bandgap circuit and is 0.5 V or 1.2 V, for example.

The value of the load resistor RX is selected, for example, so that when the resistor R1 and the load resistor RX are connected in parallel with the reference potential terminal GND, i.e., the control voltage is set to the reference voltage at the reference potential terminal, a desired maximum voltage results as the output voltage UOut. For example, the control voltage is thus output with a voltage that ranges between the reference voltage (e.g., GND) and the reference voltage VREF. Thus, the resolution of the DA converter DAC can be optimally used for the control.

When the light emitting element LED is switched on, the output voltage at the first terminal T1 should be so significantly higher than the forward voltage of the element LED that it lights up in any case. For this purpose, the control block CTL or the control element μC with its DA converter DAC generates a voltage level as a control voltage, which influences the parallel connection of the divider resistor R1 and the load resistor RX. Thus, the output voltage UOut is initially raised to a level that is safe for operation, but not optimized in terms of energy. The element LED is illuminated, and the current ILED through the element LED is limited by the bias voltage UR.

Instead of a single light-emitting element, for example a light-emitting diode or a laser diode, a respective strand connected to the first terminal can also contain several such elements connected in series, whose forward voltages then add up correspondingly to the voltage UF and through which the same current ILED flows.

To optimize the voltage drop across the series resistor RLED, this voltage drop UR is measured as the voltage feedback value and compared with the reference feedback value. If the voltage feedback value is smaller than the reference feedback value, the control voltage is reduced through the control value. Similarly, if the voltage feedback value is greater than the reference feedback value, the control voltage is increased through the control value. This allows the bias voltage UR to be kept precisely constant.

For example, a typical desired voltage drop UR across the series resistor RLED is 0.1 V.

The magnitude of the control voltage output from the DA converter DAC ultimately determines the current flow from the divider node TK through the load resistor RX, which must be applied by the voltage regulator VR through the output voltage UOut in addition to the current through the divider resistor R1. The higher this current is, the larger the output voltage UOut must be, and vice versa.

The control voltage can usually be regulated in the microsecond range. Accordingly, the effects on the regulation of the voltage regulator VR via the comparator CMP are also practically negligible.

Figure 2:
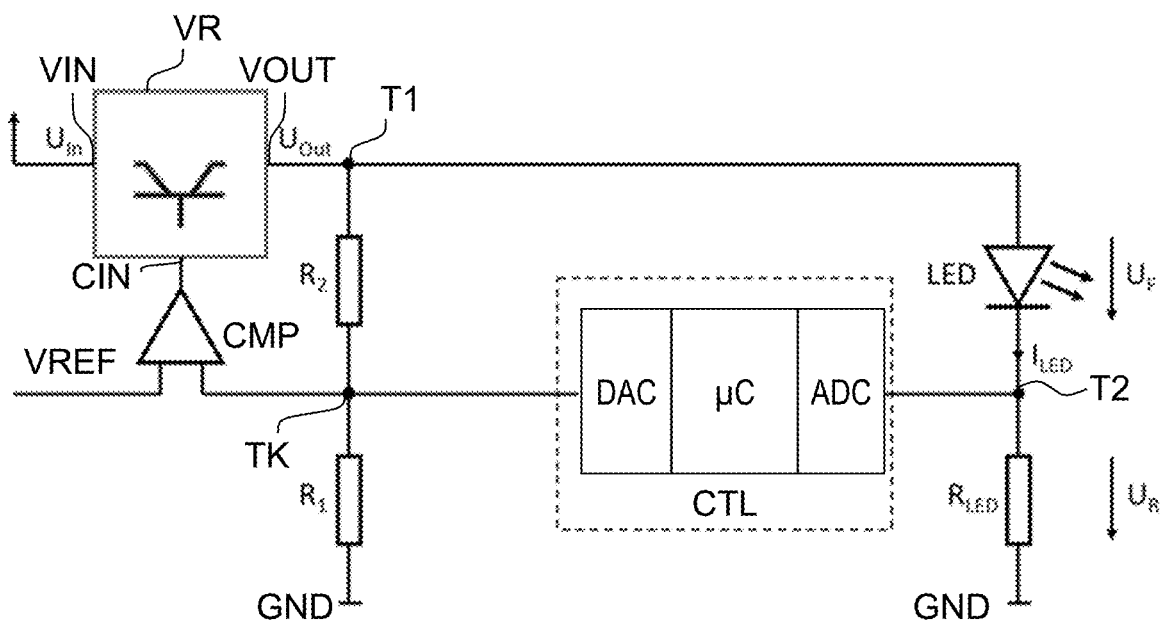
FIG. 2 shows a further example embodiment of a power supply circuit.

FIG. 2 shows an alternative embodiment of the supply circuit according to the control concept, which is essentially based on the embodiment of FIG. 1. Deviating from this, the DA converter DAC is not designed as a voltage-digital-analog converter, but as a current-digital-analog converter, which converts the control value generated by the control element μC into a control current. In particular, this control current flows from the divider node TK in the direction of the DA converter DAC.

The control is based on the same approach as previously described for the example embodiment in FIG. 1. In particular, the control element μC increases the control current through the control value when the voltage feedback value is smaller than the reference feedback value, and decreases the control current through the control value when the voltage feedback value is larger than the reference feedback value.

In the embodiments of FIG. 1 and FIG. 2, only a single strand for a light emitting element is shown as an example. However, the improved control concept can also be extended to arrangements with two or more strands. This is shown in various embodiments in FIG. 3 and FIG. 4. For reasons of clarity, only a part of the entire arrangement is shown, while the elements not shown are to be added as in FIG. 1 or FIG. 2.

For example, the arrangement comprises a further terminal T2', which is coupled with the reference potential terminal GND via a further series resistor RLED', so that at least one further light-emitting element LED' can be connected between the first terminal T1 and the at least one further terminal T2'. Further strands can be added according to the same principle. Both the second terminal T2 and the at least one further terminal T2' are coupled with the control block CTL, in particular with the AD converter ADC thereof.

Figure 3:
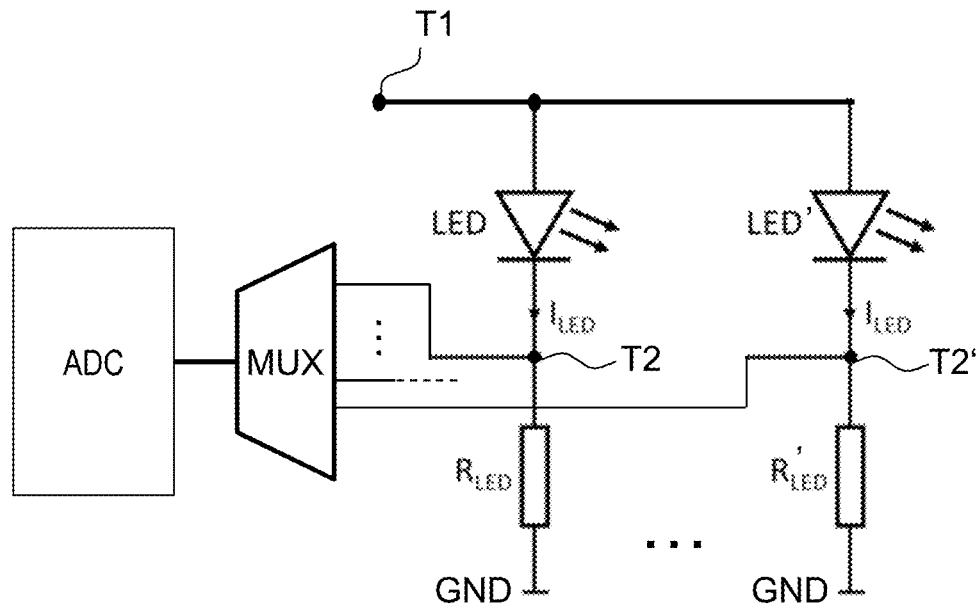
FIG. 3 shows an example embodiment of a detail of a power supply circuit.

In the embodiment of FIG. 3, a multiplexer MUX is provided for this purpose, which is connected on the input side to the second terminal T2 and the at least one further terminal T2' and, if necessary, to further terminals, and is coupled on the output side to the AD converter ADC. Thus, the multiplexer MUX can give the different voltage feedback values to the AD converter ADC.

Figure 4:
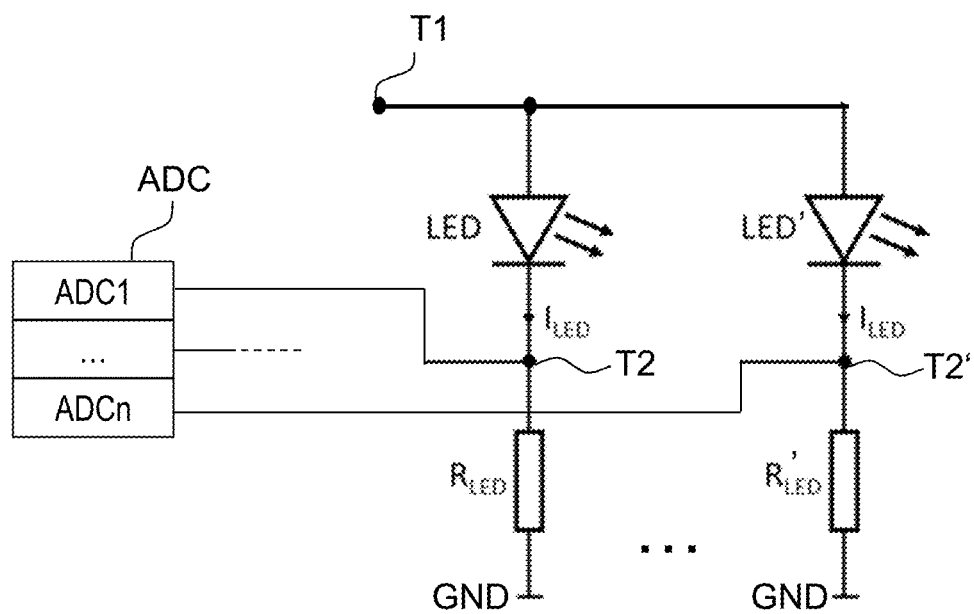
FIG. 4 shows a further example embodiment of a detail of a power supply circuit.

In the example embodiment of FIG. 4, the AD converter ADC comprises several inputs for the respective terminals, and is designed, for example, as a multi-channel analog-to-digital converter. This is indicated, for example, by the individual blocks ADC1 to ADCn.

In both embodiments, a voltage feedback value and at least one further voltage feedback value are thus generated in the AD converter ADC. The control element μC is thereby configured, for example, to adjust the control value as a function of a smallest value from the voltage feedback value and the at least one further voltage feedback value. This ensures that, for example, centralized control is possible even with multiple strands and that the highest forward voltage dominates the control.

It has been shown that compared to an uncontrolled system with fixed LED voltage, there is an increase in efficiency of up to 30%. This power would otherwise be unnecessarily dissipated as thermal power loss. This is particularly useful for battery-powered devices to extend runtime, but also saves on mains-powered devices.

The various embodiments of the supply circuit allow for dynamic control. For example, when the temperature increases, the forward voltage decreases, allowing a lower supply voltage UOut. However, the current ILED remains constant, so the system becomes more efficient. Fundamentally, the supply circuit works with any type of light emitting diode(s), regardless of their forward voltage. The improved control concept also works when several LEDs are connected in series.

If different LED types are driven alternately with different forward voltages, the power supply can be optimized to suit each type. The range extends from UF=1.6 V for red GaAsP LEDs to 2.9 V for blue and white LEDs and even 4.2 V for UV LEDs.

When switching between several LED types, the output voltage UOut can also be set statically, in particular without active control to match the LED type, by setting the reference feedback value for the voltage UR to an operationally safe value by static DAC setting. This is determined according to UOut=UF+UR, wherein UR is selected by the reference feedback value itself.

Changing the reference feedback value also changes the current flowing, so the circuit can also be used for brightness control.

The control concept can also be operated with an additional switch, for example in the strand between the first and second terminals for brightness control using pulse width modulation.

The supply circuit according to one of the described embodiments can be used, for example, in a light magnifier comprising one or more magnifying lenses for optical magnification of an object. The supply circuit with one or more corresponding light-emitting elements is thereby provided for illuminating the object and is supplied with voltage via batteries or accumulators.

For example, only one light-emitting element LED is available, which is connected between the first and the second terminal and is designed, for example, to emit visible light. In addition, however, another light-emitting element LED' may be provided between the first and the at least one further terminal, which is designed to emit light in the ultraviolet region. Further light emitting elements in the light magnifier for emitting visible and/or invisible light (ultraviolet, infrared) are also possible. In particular, if light-emitting elements of different designs and with different forward voltages are used, the supply circuit can effect and control an adapted output voltage in each case, which is adapted to the characteristics of the respective element. In this way, energy-efficient use of the battery voltage as input voltage can be achieved, which enables an extended operating time of the light magnifier until the battery is replaced.

In particular, light sources or LEDs of different wavelengths in the complete spectrum from ultraviolet to infrared as well as cold to warm white can be present in such devices in order to be able to recognize various types of printed and integrated security features on banknotes, passports or the like. Different types of LEDs can also be used, which have different electrical properties. During use, it is also frequently necessary to switch between the light sources, wherein in some cases several LEDs are activated simultaneously, and in other cases individual LEDs are activated. For reasons of handling and universal application, these devices are battery or accumulator operated and thus represent an ideal application for the improved control concept.

With the control, a particularly homogeneous illumination can be achieved in the light magnifier. In addition, with a rotating grazing light consisting of 8 light-emitting diodes, holograms and three-dimensional structures in particular can be detected especially well. The white light can also be varied in two strengths to provide a pleasant brightness for surface inspection on the one hand and full power for visualizing watermarks in transmitted light on the other.

The invention claimed is:

1. A supply circuit for supplying a light emitting element, the supply circuit comprising:
   a voltage regulator comprising a voltage input configured to receive a supply voltage, a voltage output configured to output an output voltage, and a control input configured to receive a regulation control voltage, wherein the voltage regulator is configured to control the output voltage based on the supply voltage and the regulation control voltage;
   a first terminal and a second terminal for connecting the light emitting element thereto, the first terminal being coupled to the voltage output and the second terminal being coupled to a reference potential terminal via a series resistor;
   a voltage divider circuit connected between the first terminal and the reference potential terminal and having a divider node configured to tap a divided voltage therefrom;
   a comparator comprising a first input configured to receive a comparator reference voltage, a second input connected to the divider node, and an output connected to the control input of the voltage regulator;
   a control block comprising an analog-to-digital converter configured to generate a digital voltage feedback value from a voltage applied to the second terminal, a control circuit and a digital-to-analog converter coupled to the divider node and configured to output an analog control signal based on a digital control value from the control circuit, wherein the control circuit is configured to:
compare the digital voltage feedback value with a reference feedback value;
change the digital control value in a first direction when the digital voltage feedback value is smaller than the reference feedback value; and
change the digital control value in a second, different direction when the digital voltage feedback value is greater than the reference feedback value.

2. The supply circuit according to claim 1, wherein the digital-to-analog converter is coupled to the divider node via a load resistor, and the control circuit is configured to:
output the analog control signal as a control voltage;
reduce the control voltage through the digital control value when the digital voltage feedback value is smaller than the reference feedback value; and
increase the control voltage through the digital control value when the digital voltage feedback value is greater than the reference feedback value.

3. The supply circuit according to claim 2, wherein the control circuit is configured to output the analog control signal with a voltage that is in between a reference voltage at the reference potential terminal and the comparator reference voltage.

4. The supply circuit according to claim 1, wherein the digital-to-analog converter is coupled to the divider node, the analog control signal is a control current, and the control circuit is configured to:
increase the control current through the control value when the digital voltage feedback value is smaller than the reference feedback value; and
decrease the control current through the control value when the digital voltage feedback value is greater than the reference feedback value.

5. The supply circuit according to claim 1, further comprising at least one further terminal coupled to the reference potential terminal via a further series resistor, the at least one further terminal configured to connect at least one further light emitting element between the first terminal and the at least one further terminal, wherein:
the at least one further terminal is coupled with the control block for generating at least one further voltage feedback value; and
the control circuit is configured to adjust the analog control signal based on a smallest value from: the voltage feedback value, and the at least one further digital voltage feedback value.

6. The supply circuit according to claim 5, wherein the control block comprises a multiplexer comprising a first input coupled to the second terminal, a second input coupled to the at least one further terminal, and an output coupled to the analog-to-digital converter.

7. The supply circuit according to claim 5, wherein the analog-to-digital converter comprises at least one further input coupled to the at least one further terminal.

8. The supply circuit according to claim 1, wherein the voltage regulator comprises:
a linear regulator;
a low dropout, LDO, regulator;
a buck converter;
a boost converter;
an inverse converter or buck-boost converter; or
a charge pump.

9. The supply circuit according to claim 1, wherein the control circuit is configured to detect, based on the digital voltage feedback value, whether a connection between the first terminal and the second terminal is open, and/or, whether the connection between the first terminal and the second terminal is shorted.

10. The supply circuit according to claim 1, wherein the control circuit comprises a microcontroller.

11. The supply circuit according to claim 1, further comprising one or more light emitting diodes or laser diodes connected in series as the light emitting element.

12. A light magnifier, comprising:
a supply circuit, comprising:
a voltage regulator comprising a voltage input configured to receive a supply voltage, a voltage output configured to output an output voltage, and a control input configured to receive a regulation control voltage, wherein the voltage regulator is configured to control the output voltage based on the supply voltage and the regulation control voltage;
a first terminal and a second terminal for connecting a light emitting element thereto, the first terminal being coupled to the voltage output and the second terminal being coupled to a reference potential terminal via a series resistor;
a voltage divider circuit connected between the first terminal and the reference potential terminal and having a divider node configured to tap a divided voltage therefrom;
a comparator comprising a first input configured to receive a comparator reference voltage, a second input connected to the divider node, and an output connected to the control input of the voltage regulator;
a control block comprising an analog-to-digital converter configured to generate a digital voltage feedback value from a voltage applied to the second terminal, a control circuit and a digital-to-analog converter coupled to the divider node and configured to output an analog control signal based on a digital control value from the control circuit, wherein the control circuit is configured to:
compare the digital voltage feedback value with a reference feedback value;
change the digital control value in a first direction when the digital voltage feedback value is smaller than the reference feedback value; and
change the digital control value in a second, different direction when the digital voltage feedback value is greater than the reference feedback value;
one or more light emitting diodes or laser diodes connected in series as the light emitting element; and
one or more magnifying lenses for optically magnifying an object, wherein the light emitting element is disposed to illuminate the object.

13. The light magnifier according to claim 12, wherein
the supply circuit further comprises at least one further terminal coupled to the reference potential terminal via a further series resistor, for connecting at least one further light emitting element between the first terminal and the at least one further terminal;
the at least one further terminal is coupled with the control block for generating at least one further voltage feedback value;
the control circuit is configured to adjust the analog control signal based on a smallest value from: the digital voltage feedback value, and the at least one further digital voltage feedback value;

the light emitting element is disposed between the first terminal and the second terminal and is configured to emit visible light; and the further light emitting element is disposed between the first terminal and the at least one further terminal, and is configured to emit light in the ultraviolet region.

* * * * *